Re. 24571

Dec. 17, 1957     M. R. NADEL     2,816,666

DISPLAY DEVICES

Filed Oct. 10, 1956     3 Sheets—Sheet 1

INVENTOR.
Manuel R. Nadel
BY Harry Radzwick
Attorney

Dec. 17, 1957 M. R. NADEL 2,816,666
DISPLAY DEVICES
Filed Oct. 10, 1956 3 Sheets-Sheet 2
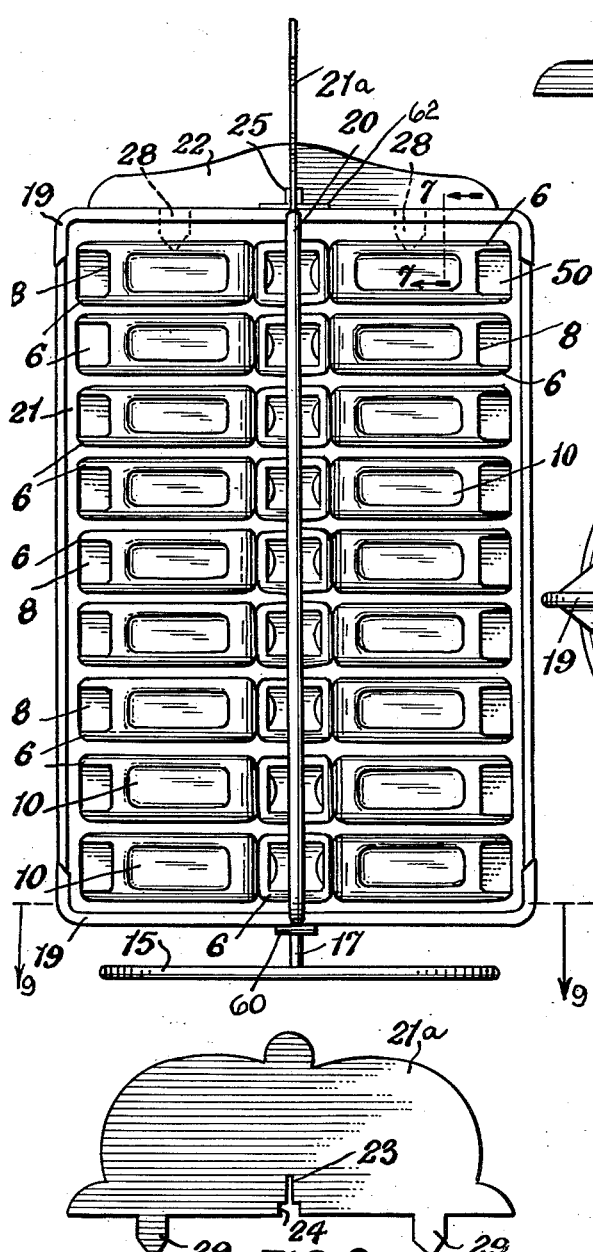
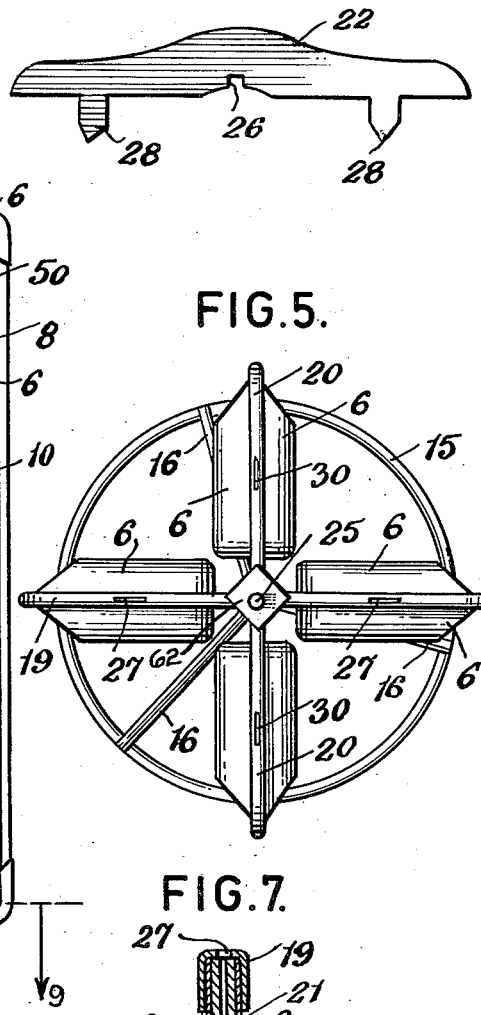
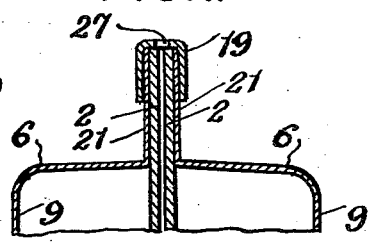
INVENTOR.
Manuel R. Nadel
BY
Attorney Dec. 17, 1957  M. R. NADEL  2,816,666
DISPLAY DEVICES Filed Oct. 10, 1956  3 Sheets-Sheet 3

INVENTOR.
Manuel R. Nadel
BY
*Harry Radzinsky*
*Attorney*

United States Patent Office 2,816,666
Patented Dec. 17, 1957

2,816,666

DISPLAY DEVICES

Manuel R. Nadel, New York, N. Y., assignor to Compton Company, Ltd., New York, N. Y., a corporation of New York Application October 10, 1956, Serial No. 615,068

4 Claims. (Cl. 211—13)

This invention relates to display devices, and particularly to those of a type which can be used for the attractive display of certain kinds of merchandise, such as for example, eyeglasses, sunglasses, other types of optical goods and numerous other products.

It is an object of the invention to provide a device of this character which can be used as a display card for holding the goods, or employed as a rack or display stand for holding a very substantial number of the goods in an attractive and protective fashion while occupying relatively small counter or floor space.

Many types of goods, and particularly eyeglasses or sunglasses which are handled or tried on by the prospective customer, are subject to damage or breakage and it is therefore desirable that the goods be displayed in a manner which while enabling them to be fully inspected, will not require their detachment from the card by which they are held. It is another object of the invention to provide a display stand which will enable a substantial number of articles to be simultaneously displayed for side-by-side comparison without requiring handling of the articles or their removal from their holders.

More particularly, the invention contemplates the provision of a card provided on one or both of its faces with a plurality of compartments, containers or pockets of transparent material, the pockets being each provided with an element for keeping the eyeglasses or sunglasses in an erect display position within them and provided at one end with an opening through which the glasses may be inserted into the pocket or readily removed therefrom.

With these and other objects to be hereinafter set forth in view, I have devised the arrangement of parts to be described and more particularly pointed out in the claims appended hereto.

In the accompanying drawings, wherein an illustrative embodiment of the invention is disclosed, Fig. 1 is a front elevational view of a display card constructed in accordance with the invention;

Fig. 4 is an elevational view of a display stand in which a number of cards similar in structure to that shown in Fig. 1 are incorporated;

Fig. 5 is a top plan view of the structure shown in Fig. 4, but with the decorative advertising cards at the top omitted;

Fig. 6 is a face view of one of the advertising cards;

Fig. 7 is a sectional view, taken substantially on the line 7—7 of Fig. 4, looking in the direction of the arrows;

Fig. 8 is a face view of the second advertising card;

Figure 1:
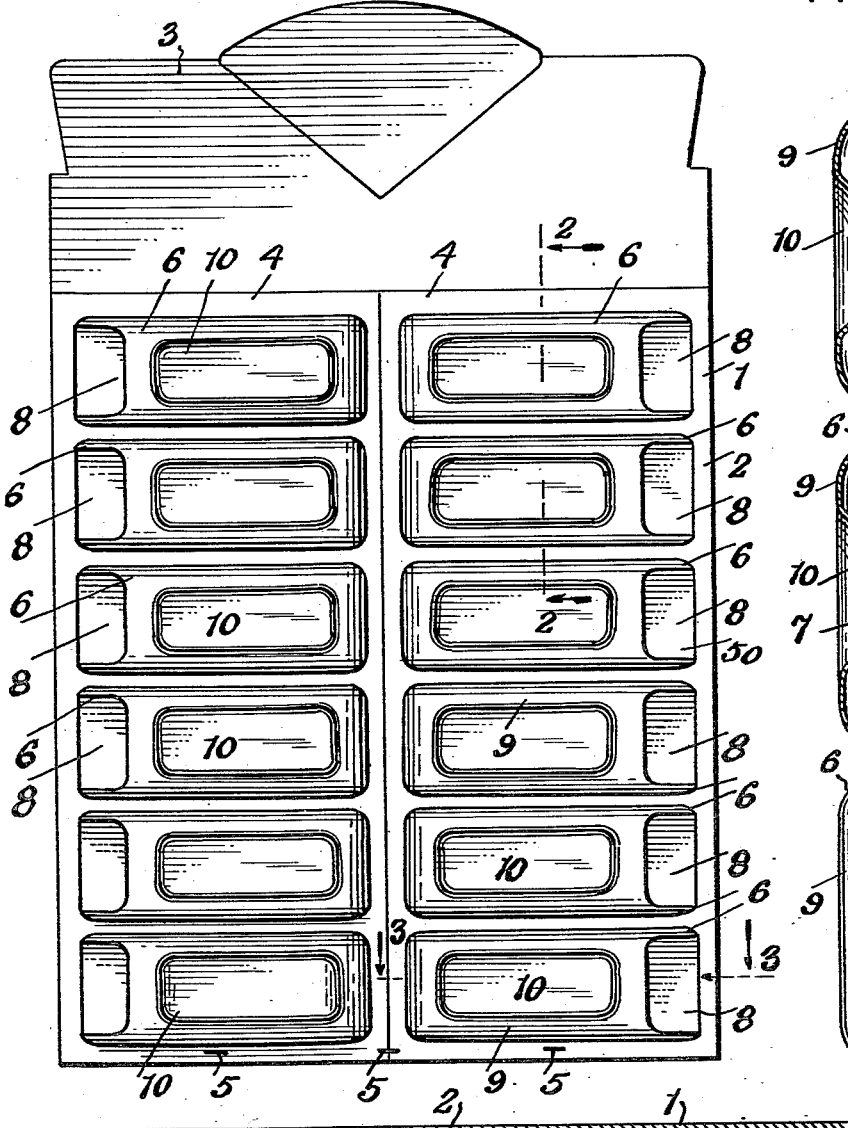
Figure 2:
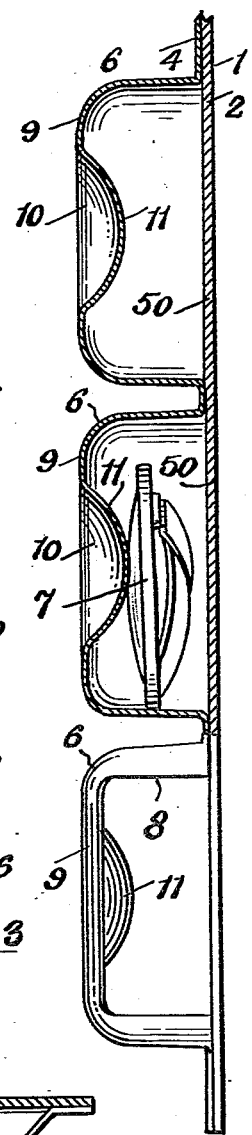
Fig. 2 is a sectional view, taken substantially on the line 2—2 of Fig. 1, looking in the direction of the arrows.
Figure 3:
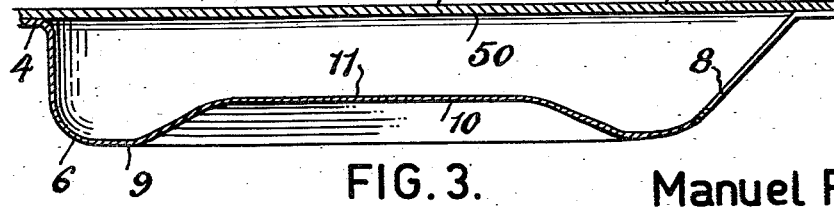
Fig. 3 is a sectional view, taken substantially on the line 3—3 of Fig. 1, looking in the direction of the arrows.
Figure 9:
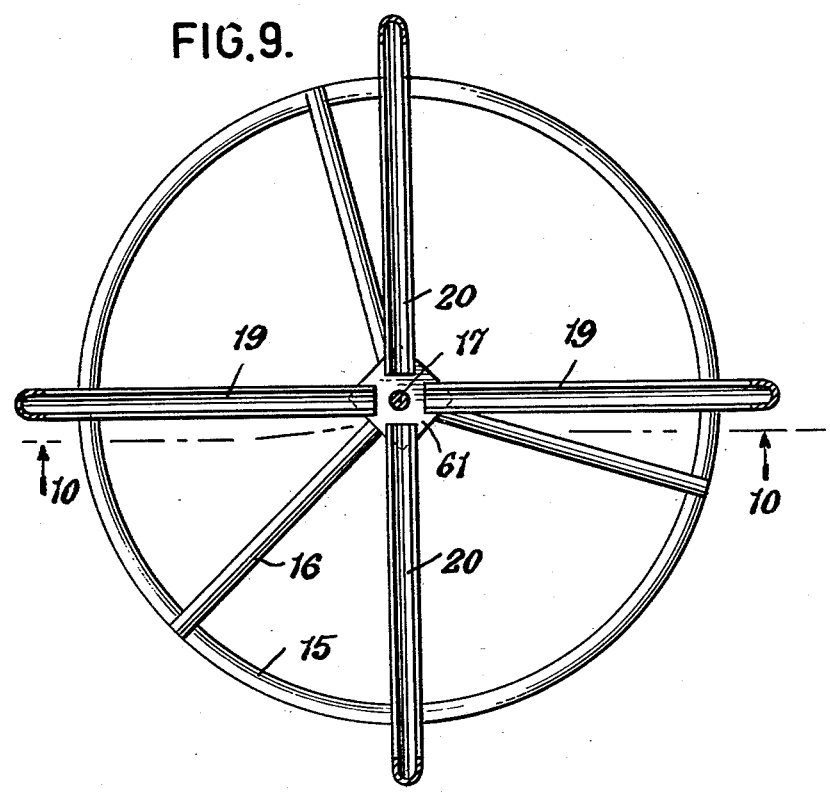
Fig. 9 is a sectional view on an enlarged scale, taken on the line 9—9 of Fig. 4, looking in the direction of the arrows.
Figure 10:
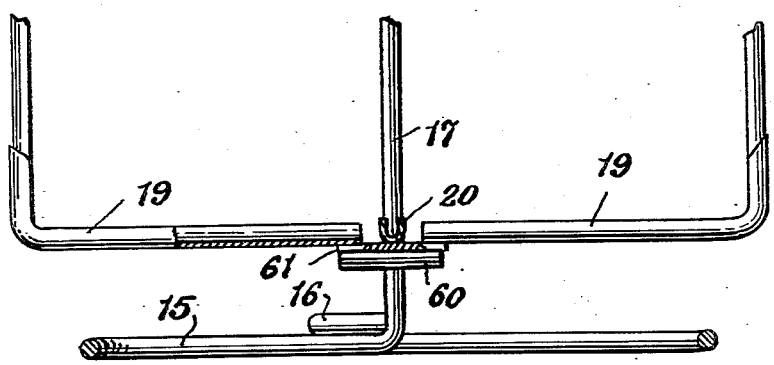
Fig. 10 is a sectional view on the line 10—10 of Fig. 9, looking in the direction of the arrows.

Referring to the drawings, and more particularly to Figs. 1 to 3 thereof, 1 indicates generally a display card made in accordance with the invention. The same includes a backing sheet which may be composed of relatively heavy cardboard and may be ornamentally shaped at the top, as indicated at 3 to bear advertising material in this area.

Secured to at least one face of the backing sheet 2 is one or more sheets 4 of relatively thin, flexible transparent material, such as a transparent plastic material. The sheets 4 may be intimately secured to the face of the backing sheet 2 by means of a suitable adhesive, or by staples, some of which are shown at 5, or other fastening means. Each of the sheets 4 is distorted outwardly at regular intervals to produce in it a plurality of forwardly projecting, substantially rectangular receptacles or pockets 6 of relatively elongated formation to each hold and enclose a pair of eyeglasses 7 or other suitable goods for display. The pockets 6 are open at one end, as indicated at 8, and through these openings 8 the eyeglasses may be readily inserted or removed from the pocket when desired. It will be noted that the end wall in which the opening 8 is formed is inclined or slanted from the front of the pocket to the rear thereof so that the opening 8 is plainly visible from the front of the card and is easily accessible for the fingers to enter and remove the eyeglasses from the pocket. In the front wall 9 of each of the pockets is provided an elongated, inwardly-extending depression 10, resulting in the formation of an inward protuberance 11 which not only tends to materially stiffen the front wall 9 of each of the pockets, but also serves to provide a rest against which the eyeglasses contained in the pocket will be disposed and the eyeglasses thus held in an erect position for easy viewing and inspection by the customer. The back wall of each of the pockets is formed by the backing card as indicated at 50. When an eyeglass is contained in each of the pockets or receptacles 6, it will be apparent that a substantial number of the eyeglasses will be displayed in the several closely-positioned rows of pockets. The customer can thus readily inspect a very substantial number of pairs of eyeglasses and thus, without removing any of them from the pockets, can decide upon the one to be purchased, whereupon it may be readily removed through the opening 8 at one end of the selected pocket.

While the opening 8 in one end of the pocket permits ready removal of the eyeglass from the pocket, the removal of the eyeglass is not so easy as to permit falling out of the eyeglasses when the card is handled nor will it allow of ready extraction of the eyeglasses if pilfering is attempted. Except for the opening 8, the pockets are completely closed around the eyeglass and effectively protect it from dust and dirt and excessive, unnecessary handling and possibly dropping of the eyeglasses.

In the embodiment of the invention shown in Figs. 4 to 8 inclusive, a display stand is shown for holding a substantial number of the cards, each of which cards can be constructed somewhat similarly to that shown in Fig. 1. The display stand is provided at its lower end with a supporting ring-shaped base 15 suitably connected by radial braces 16 to a central vertical spindle 17 upon which the display panels are rotatively mounted. The display cards 21 are mounted in four, rectangular frames 19 and 20, each containing a plurality of the display cards 21 constructed substantially as described in connection with the disclosures of Fig. 1. The cards 21 held by the frames 19 and 20 are placed back-to-back, as will be apparent from Fig. 7 and have their edges confined in the channel-shaped frames 19 and 20. Provided on the spindle 17 near the supporting ring 15, is a cross piece 60 on which a plate 61 is rotatably mounted. The inner lower ends of the four frames 19 and 20 are secured to the plate 61, such as by being welded thereto. The upper inner ends of the frames 19 and 20 are similarly connected to a top plate 62 (Figs. 4 and 5) and the spindle 17 passes through these plates which are freely rotatable around the spindle, thus acting as bearing members for the frame assembly.

The top of the display stand may receive advertising cards, such as shown for example at 21ᵃ in Fig. 8, and at 22 in Fig. 6. These two cards are placed in interengaging, crossed relation, the card shown at 21ᵃ being provided in its lower edge with a slot 23 which fits over the upper edge of the card 22. Card 21ᵃ is also formed with a notch 24 enabling it to clear the projecting upper end 25 of the vertical spindle 17. A notch 26 is also provided in the lower edge of the card 22 to enable the latter card to clear the upper end 25 of the spindle 17. Provided in the top portion of the frames 19 are suitably-positioned slots 27 arranged to receive the tongues 28 formed on the card 22 and which tongues project downwardly from the lower edge thereof. Similar tongues 29 are provided on the lower edge of the card 21ᵃ, said tongues being received in the slots 30 provided in the top portion of the frames 19.

From the foregoing, the uses and advantages of the improved display device will be apparent. Cards constructed as shown in Figs. 1 to 3 can be suspended or otherwise held upright, and each card will contain and attractively display a substantial number of the eyeglasses in a protected, enclosed manner so that while all of the eyeglasses are fully displayed and are arranged in juxtaposition, they are protected from dust and dirt and from excessive handling or pilfering.

When a display stand constructed as shown in Figs. 4 to 8 is employed, it can be used to advantage upon a counter or other location in a store. The device can be rotated for complete inspection of all of its contents, which are enclosed and protected in the manner described in connection with Fig. 1.

Having described an embodiment of the invention, it is obvious that the same is not to be restricted thereto, but is broad enough to cover all structures coming within the scope of the annexed claims.

What I claim is:

1. A display stand comprising a base, a central spindle extending upwardly from the base, a plurality of crossed rectangular frames rotatively supported in radial relation on the spindle, each frame containing a plurality of back-to-back display cards, each card having a transparent plastic sheet secured to its face, each plastic sheet being distorted to form a plurality of forwardly-protruding pockets of a size and shape to each contain and enclose an eyeglass, each pocket being open at an end at the outer edge of its frame to permit the insertion of the eyeglass in it or permit the removal of the eyeglass from within the pocket.

2. A display stand comprising a ring-shaped base, a central spindle extending vertically upward from the base, a plurality of channelled frames rotatively supported on and in radial relation to the spindle, each frame containing a plurality of back-to-back display cards having their edges in the channels, each card having a transparent plastic sheet secured to its face, each plastic sheet being distorted at regular intervals to form a plurality of forwardly-protruding pockets each of which is of a size and shape to contain and enclose an eyeglass, each pocket being open at one end to permit the insertion of the eyeglass in it or permit the removal of the eyeglass from within the pocket, the open ends of the pockets being located adjacent to the outer edges of the frames.

3. A display device for eyeglasses, comprising a flat backing sheet of cardboard, at least one separate sheet of a thin, transparent plastic material disposed over a face of the backing sheet and secured along its marginal edges to the backing sheet, said transparent plastic sheet being outwardly distorted at regular intervals to produce a plurality of vertically aligned relatively deep, substantially rectangular pockets, each pocket including side walls and end walls of substantial depth and an imperforate front wall and being closed at the back by the backing sheet, said front wall being indented inwardly of its marginal edges and centrally thereof to produce a pushed-in rounded protuberance decreasing the containing capacity of the pocket and materially stiffening the front wall of the pocket and serving to engage and hold an eyeglass upright within the pocket, one of the end walls being inclined and being located at an edge of the backing sheet and being provided with an aperture sufficiently large to permit an eyeglass to be inserted within or removed from the pocket.

4. A display card for eyeglasses, said card having a stiff backing sheet, at least one sheet of flexible, transparent sheet material attached to a face of the backing sheet, said sheet material being outwardly distorted at uniformly-spaced locations to provide a vertical series of merchandise-holding pockets between it and the backing sheet, each of said pockets having an imperforate front wall, upper and lower walls and end walls, the front wall having an elongated inwardly-extending bulge inwardly of the marginal edge thereof resulting in an inward protuberance within the pocket and inwardly beyond the plane of the front wall to stiffen the front walls of the pocket, each pocket being of a shape and size to loosely and removably accommodate a pair of eyeglasses within it, the protuberance reducing the depth of the pocket to an extent to engage and maintain the eyeglasses upright and on edge within it, one of the end walls having an opening through which the eyeglasses can be passed to insert them into or remove them from the pocket, said end wall being slanted to facilitate entrance of the fingers to engage the eyeglasses.

References Cited in the file of this patent

UNITED STATES PATENTS

| Number | Name | Date |
|---|---|---|
| D. 115,526 | Salfisberg | July 4, 1939 |
| D. 119,152 | Bender | Feb. 27, 1940 |
| D. 119,269 | Lackow et al. | Mar. 5, 1940 |
| D. 178,030 | Westerman | June 12, 1956 |
| 1,569,424 | Jacobus | Jan. 12, 1926 |
| 1,689,528 | Kjellerup | Oct. 30, 1928 |
| 1,784,937 | Krewlawsky | Dec. 16, 1930 |
| 1,831,036 | Scholl | Nov. 10, 1931 |
| 1,843,951 | Lorentzen | Feb. 9, 1932 |
| 1,858,152 | Hallowell et al. | May 10, 1932 |
| 1,960,558 | Stein | May 29, 1934 |
| 2,151,486 | Ramel et al. | Mar. 21, 1939 |
| 2,428,498 | McWilliams | Oct. 7, 1947 |
| 2,568,625 | Harvey | Sept. 18, 1951 |